July 17, 1962   W. SCHÄFER   3,044,375
CAMERA WITH BUILT-IN EXPOSURE METER
Filed March 13, 1961
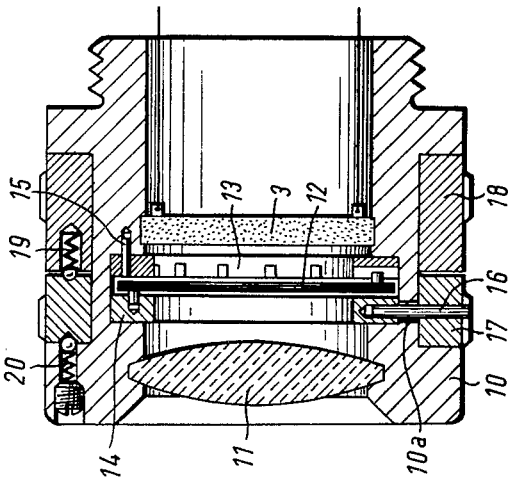
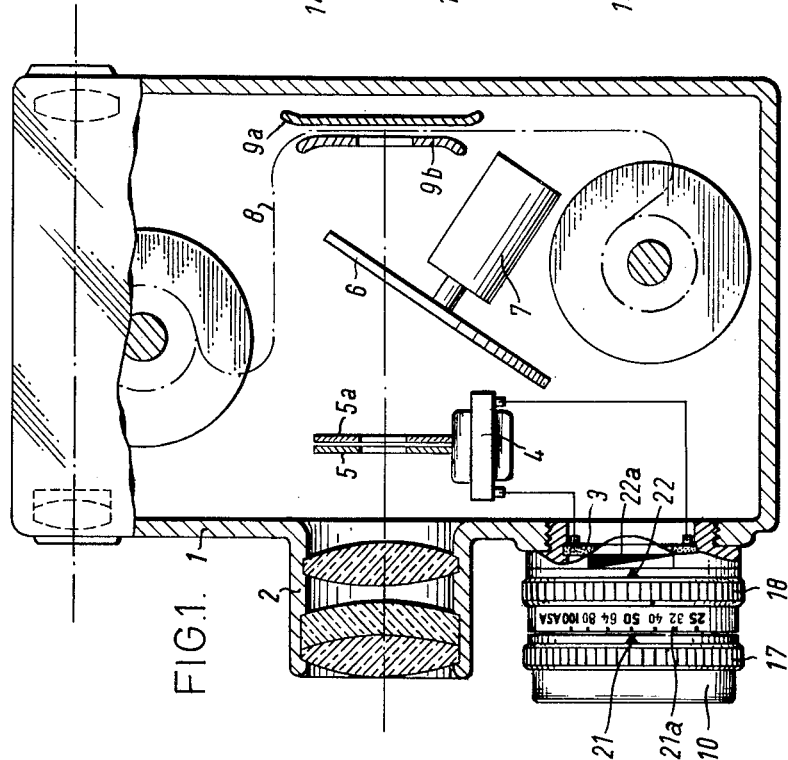
INVENTOR:
WILHELM SCHÄFER
BY Toulmin & Toulmin
Attorneys

United States Patent Office 3,044,375
Patented July 17, 1962

3,044,375
CAMERA WITH BUILT-IN EXPOSURE METER
Wilhelm Schäfer, Wetzlar (Lahn), Germany, assignor to Ernst Leitz Gesellschaft mit beschränkter Haftung, Wetzlar (Lahn), Germany
Filed Mar. 13, 1961, Ser. No. 95,433
Claims priority, application Germany Apr. 1, 1960
3 Claims. (Cl. 95—10)

The present invention relates to a camera having a built-in exposure meter, more particularly, to a motion-picture or photographic camera having an adjustable structure to compensate for the proportion of light and dark areas of the objects to be photographed.

Cameras have been constructed having exposure meters built-in wherein the operator of the camera can make certain adjustments in order to compensate for the relative percentage distribution of light and dark areas in the field of view of the camera objective. With this arrangement the user can correct the readings of the exposure meter to compensate for a preponderance of light or dark areas in the photographic field.

In one previously proposed embodiment a variable diaphragm is positioned in front of a photoelectric cell so that adjustment of the diaphragm will enlarge or decrease the quantity of light received upon the photoelectric cell of the exposure meter. Adjustment of the variable diaphragm in effect varies the active surface of the photoelectric cell. The diaphragm has a pointer which cooperates with a scale having variable proportions of light and dark areas. In operation, the user of the camera merely adjusts the opening of the diaphragm until this pointer registers with that portion of the light and dark scale which corresponds to the light and dark areas of the field of view of the camera.

It is the principal object of this invention to provide a novel and improved camera having a built-in exposure meter.

It is another object of this invention to provide a camera having a built-in exposure meter with adjusting means to compensate for the light and dark areas in the field of view of the objective of the camera.

It is a further object of this invention to provide a camera with a built-in exposure meter having structure to adjust the camera to compensate for other factors as well as for the light and dark areas of the field of view of the camera.

The present invention improves the prior art embodiment as described above in that the variable diaphragm, which is positioned in front of the photoelectric cell, is also variable to compensate for factors in addition to the light and dark areas of the object to be photographed.

In the present invention a plurality of adjusting rings is provided wherein each ring corresponds to a photographic factor such as the film-sensitivity. One of the adjusting rings is for compensating for the light and dark areas of the object to be photographed.

In operation, the several factors relating to taking a photograph are usually compensated for in a predetermined and regular sequence. In the present invention, however, the adjusting rings are arranged in the sequence in which the factors corresponding to these rings are adjusted.

Each of the adjusting rings has a spring detent which positions the adjusting ring with respect to another ring. The strength of these spring detents increases in the order in which the adjusting rings are manipulated.

Other objects and advantages of this invention will be apparent upon reference to the accompanying description when taken in conjunction with the following drawings, wherein FIGURE 1 is a vertical cross-sectional view of a motion-picture camera embodying the present invention; and
FIGURE 2 is a vertical sectional view through the objective of the exposure meter and showing the structural details of the present invention.

A specific embodiment of this invention will next be described with reference to the accompanying drawings wherein like reference symbols indicate the same parts throughout the various views.

There is shown in FIGURE 1 a casing 1 of a motion-picture camera which has a fixed objective mounting 2. The same wall of the camera casing upon which the objective is mounted has a photoelectric cell 3 mounted therein which, in turn, is connected to a pair of measuring instruments 4. The measuring instruments 4 respectively actuate diaphragms 5 and 5a. The camera additionally comprises an inclined sector diaphragm 6 which is rotated by an electric motor 7. The motor 7 is connected by conventional structure to a mechanism for advancing a film strip 8 intermittently between a film track 9a and a film gate 9b having a viewing aperture therein.

The photoelectric cell 3 is mounted in a tubular socket 10 which is threaded into the wall of the camera casing 1. The socket is provided with a lens 11 and a variable iris diaphragm comprising a plurality of plates 12, a plate base 13, and a plate guide ring 14. The diaphragm functions to adjust the quantity of light falling upon the photoelectric cell 3 and is positioned between the photoelectric cell 3 and the lens 11. The plate base 13 is fixedly connected with the socket 10 by a pin 15.

The plate guide ring 14 is rotatable with respect to the plate base 13 and is connected by a pin 16 to an adjusting ring 17 which is rotatably mounted on the outer surface of the socket 10. The pin 16 moves in an arcuate slot 10a which is formed in the wall of the socket 10. Accordingly, the ends of the slot 10a also limit the range of movement of the pin 16 and hence the rotation of the adjusting ring 17.

There is a second adjusting ring 18 also rotatably mounted on the outer surface of the socket 10. A spring-guided ball detent 19 is mounted in the ring 18 and engages the ring 17 so as to lock the rings 17 and 18 in a position with respect to each other.

There is a second spring-guided ball detent 20 mounted in the wall of the socket 10 and which engages the ring 17 so as to lock the ring 17 in position with respect to the socket. Both of the rings 17 and 18 have the outer peripheral surfaces thereof knurled so as to facilitate manipulation thereof by the user of the camera.

The spring of the detent 19 is stronger than that of the detent 20 so that the detent 19 in effect has a stronger locking force than the detent 20.

The adjustable ring 17 has an index 21 which registers with a scale of film sensitivity 21a which scale is mounted on the adjustable ring 18.

The ring 18 has an index or pointer 22 which registers with a scale 22a which scale is comprised of varying relative areas of black and white. This scale 22a is mounted on the outer wall of the socket 10 and is therefore stationary with respect to the adjusting rings 17 and 18. The scale 22a comprises two triangular-shaped black and white areas. Thus, every point along the long side of the scale indicates a corresponding proportion of black and white.

When it is desired to use the camera, the sensitivity of the film is first noted and a proper adjustment of the ring 17 is made. This is accomplished by a relative rotation of the adjusting rings 17 and 18 with respect to each other by exerting a force which is sufficient to release the detent 19. The user then estimates the relative percentage of light and dark areas of the field of view of the camera and rotates the ring 18 until the index 22 registers with that portion of the scale 22a which corresponds to the proportion of light and dark areas of the object to be photographed. The rings 17 and 18 will be rotated together when adjusting for the light and dark areas.

Under those conditions wherein the light and dark areas are substantially equal the index 22 will be at the center of the scale 22a.

It will be apparent that the variable diaphragm 12 will be adjusted twice during the aforementioned movements of the rings 17 and 18. These adjustments will occur when a compensation is made for the film-sensitivity and when the second adjustment is made to compensate for the relative light and dark areas of the object. It is therefore quite possible that under certain conditions these adjustments of the diaphragm may be in opposite directions so as to in effect cancel each other.

If, by way of example, the camera has been adjusted to compensate for a medium film sensitivity of 50 ASA and to an equal distribution of light and dark areas, the opening of the diaphragm 12 is approximately medium-sized. All subsequent modifications of these values will affect the size of the opening of the variable diaphragm and accordingly will vary the quantity of light received by the photoelectric cell. The light received by the photoelectric cell determines the quantity of current generated by the cell and conveyed to the measuring instruments 4. The measuring instruments 4 will then adjust the objective diaphragms 5 and 5a in accordance with the light received by the photoelectric cell.

It is thus apparent that if the ring 17 is adjusted for a higher value of film sensitivity, the aperture of the variable diaphragm 12 will be increased whereas the opening in this diaphragm will be decreased if a lower value of film sensitivity is set by the adjusting ring 17.

Where a higher value of film sensitivity is encountered the opening of the objective diaphragm will be decreased and where a lower value of film sensitivity is encountered the objective diaphragm will be correspondingly enlarged.

Under those conditions wherein the dark areas preponderate in the field of view of the camera the index mark 22 will be moved towards the darker end of the scale 22a or upwardly, as viewed in FIGURE 1. The opening of the variable exposure meter diaphragm 12 will then be increased which, in turn, will cause a corresponding decrease in the opening of the objective diaphragm 5. As a result, the quantity of light received upon the film through the objective 2 will be decreased. Under those conditions wherein the index 22 is to be moved towards the white end of the scale 22a the opening of the variable diaphragm 12 will be decreased and the opening of the objective diaphragm 5 will be correspondingly increased.

Thus it can be seen that the present invention provides a structure whereby a plurality of adjustments may be made to compensate for various factors relating to the use of a camera. Thus, not only can the user of a camera compensate for the proportion of light and dark areas in the field of view of the camera, but he can also compensate for other factors such as film sensitivity.

It will be understood that this invention is susceptible to modifications in order to adapt it to different usages and conditions and, accordingly, it is desired to comprehend such modifications within this invention as may fall within the scope of the appended claims.

What I claim is:

1. A camera comprising a socket mounted on the camera casing, an exposure meter within the camera casing and having a photoelectric cell within said socket, a variable diaphragm in said socket in front of said photoelectric cell, a first adjusting ring rotatably mounted on said socket and connected to said variable diaphragm for adjustment thereof, there being an index pointer on said first adjusting ring, a first resilient detent for positioning said first adjusting ring with respect to said socket, a second adjusting ring rotatably mounted on said socket and having a film-sensitivity scale thereon cooperating with said first adjusting ring index pointer, there being an index pointer on said second adjusting ring, a light-dark area scale on said socket cooperating with said second adjusting ring pointer, and a second resilient detent connecting said second adjusting ring with respect to said first adjusting ring and having a greater strength than said first resilient detent so that adjustment of said second adjusting ring will also drive said first adjusting ring to readjust said variable diaphragm.

2. A camera as claimed in claim 1 wherein said light-dark area scale comprises gradually varying proportional white and black areas so that positioning of the second adjusting ring pointer on said scale will indicate an estimated proportion of the light and dark areas of the scene to be photographed.

3. A camera as claimed in claim 1 wherein said light-dark area scale comprises an elongated rectangular area with the longer dimension thereof positioned circumferentially on said socket and a diagonal line through said rectangular area to divide said area into two triangular spaces with one space being white and the other space being black, thereby indicating proportional light-dark areas along points of said scale.

References Cited in the file of this patent
UNITED STATES PATENTS

| | | |
|---|---|---|
| 2,829,574 | Gebele | Apr. 8, 1958 |
| 2,955,519 | Sommer | Oct. 11, 1960 |
| 2,975,693 | Ort | Mar. 21, 1961 |